(12) United States Patent
de Heer

(10) Patent No.: US 9,390,425 B2
(45) Date of Patent: Jul. 12, 2016

(54) ONLINE ADVERTISEMENT SELECTION

(75) Inventor: David L. de Heer, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 130 days.

(21) Appl. No.: 13/290,911

(22) Filed: Nov. 7, 2011

(65) Prior Publication Data

US 2012/0054792 A1 Mar. 1, 2012

Related U.S. Application Data

(63) Continuation of application No. 11/934,074, filed on Nov. 1, 2007, now Pat. No. 8,082,179.

(51) Int. Cl.

| | |
|---|---|
| *H04N 7/10* | (2006.01) |
| *H04N 7/025* | (2006.01) |
| *G06Q 30/02* | (2012.01) |
| *H04N 21/442* | (2011.01) |
| *H04N 21/258* | (2011.01) |
| *H04N 21/81* | (2011.01) |
| *H04N 21/235* | (2011.01) |
| *H04N 7/173* | (2011.01) |
| *H04N 21/45* | (2011.01) |
| *H04N 21/433* | (2011.01) |
| *H04N 21/435* | (2011.01) |

(52) U.S. Cl.
CPC ............ *G06Q 30/02* (2013.01); *G06Q 30/0201* (2013.01); *G06Q 30/0239* (2013.01); *G06Q 30/0241* (2013.01); *G06Q 30/0256* (2013.01); *G06Q 30/0277* (2013.01); *H04N 7/17318* (2013.01); *H04N 21/235* (2013.01); *H04N 21/25891* (2013.01); *H04N 21/435* (2013.01); *H04N 21/4331* (2013.01); *H04N 21/44222* (2013.01); *H04N 21/4532* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 4,949,187 | A | 8/1990 | Cohen |
| 5,038,211 | A | 8/1991 | Hallenbeck |
| 5,227,874 | A | 7/1993 | Von Kohorn |
| 5,371,551 | A | 12/1994 | Logan et al. |
| 5,973,683 | A | 10/1999 | Cragun et al. |
| 6,233,389 | B1 | 5/2001 | Barton et al. |
| 6,256,739 | B1 * | 7/2001 | Skopp et al. ............... 726/2 |

(Continued)

FOREIGN PATENT DOCUMENTS

| | | |
|---|---|---|
| KR | 20000050255 | 8/2000 |
| WO | WO-2009058716 | 5/2009 |

OTHER PUBLICATIONS

"Advertising.com Enhances AdLearn Optimization Technology", http://www.advertising.com/press_room_article.php?id=196 &ofs=0, (Jun. 26, 2001), 3 pages.

(Continued)

*Primary Examiner* — Jonathan V Lewis
(74) *Attorney, Agent, or Firm* — Steve Wight; Sandy Swain; Micky Minhas

(57) ABSTRACT

Online advertisement selection techniques are described. In an implementation, data is obtained which describes interaction of one or more clients with advertisements embedded in television content. An advertisement is selected to be displayed in conjunction with web content accessed by the one or more clients based on the interaction with the advertisements described in the data.

20 Claims, 4 Drawing Sheets

(56) References Cited

U.S. PATENT DOCUMENTS

| | | | |
|---|---|---|---|
| 6,487,538 B1 * | 11/2002 | Gupta | G06Q 30/02 705/14.66 |
| 6,545,722 B1 | 4/2003 | Schultheiss et al. | |
| 6,553,178 B2 | 4/2003 | Abecassis | |
| 6,757,707 B1 | 6/2004 | Houghton | |
| 7,065,709 B2 | 6/2006 | Ellis | |
| 7,806,329 B2 | 10/2010 | Dmitriev et al. | |
| 8,082,179 B2 * | 12/2011 | de Heer | G06Q 30/02 705/14.73 |
| 8,327,128 B1 * | 12/2012 | Prince et al. | 713/150 |
| 8,352,980 B2 * | 1/2013 | Howcroft | H04H 60/46 705/14.4 |
| 2001/0049620 A1 * | 12/2001 | Blasko | 705/10 |
| 2002/0010928 A1 * | 1/2002 | Sahota | G06F 17/3089 725/40 |
| 2002/0059094 A1 * | 5/2002 | Hosea et al. | 705/10 |
| 2002/0120934 A1 * | 8/2002 | Abrahams | G06Q 30/06 725/60 |
| 2002/0123928 A1 | 9/2002 | Eldering et al. | |
| 2003/0033157 A1 | 2/2003 | Dempski et al. | |
| 2003/0066078 A1 * | 4/2003 | Bjorgan et al. | 725/34 |
| 2003/0074661 A1 | 4/2003 | Krapf et al. | |
| 2003/0093792 A1 * | 5/2003 | Labeeb et al. | 725/46 |
| 2003/0172376 A1 * | 9/2003 | Coffin, III | 725/22 |
| 2003/0229893 A1 * | 12/2003 | Sgaraglino | 725/37 |
| 2004/0249975 A1 * | 12/2004 | Tuck et al. | 709/245 |
| 2006/0015904 A1 * | 1/2006 | Marcus | 725/46 |
| 2006/0195441 A1 * | 8/2006 | Julia et al. | 707/5 |
| 2006/0253323 A1 | 11/2006 | Phan | |
| 2006/0271953 A1 | 11/2006 | Jacoby et al. | |
| 2007/0016918 A1 * | 1/2007 | Alcorn et al. | 725/22 |
| 2007/0038516 A1 | 2/2007 | Apple et al. | |
| 2007/0100690 A1 * | 5/2007 | Hopkins | G06Q 30/02 705/14.67 |
| 2007/0250863 A1 * | 10/2007 | Ferguson | 725/46 |
| 2007/0283384 A1 | 12/2007 | Haeuser | |
| 2008/0086574 A1 * | 4/2008 | Raciborski et al. | 709/245 |
| 2008/0092159 A1 * | 4/2008 | Dmitriev et al. | 725/34 |
| 2008/0109843 A1 * | 5/2008 | Ullah | 725/34 |
| 2008/0195458 A1 * | 8/2008 | Anschutz et al. | 705/10 |
| 2008/0201733 A1 * | 8/2008 | Ertugrul | G06F 17/30867 725/32 |
| 2008/0259906 A1 * | 10/2008 | Shkedi | 370/352 |
| 2008/0288976 A1 * | 11/2008 | Carson et al. | 725/34 |
| 2009/0031339 A1 * | 1/2009 | Pickens et al. | 725/32 |
| 2009/0063983 A1 * | 3/2009 | Amidon et al. | 715/733 |
| 2009/0106785 A1 * | 4/2009 | Pharn | H04H 20/103 725/9 |
| 2009/0119151 A1 | 5/2009 | de Heer | |
| 2009/0186704 A1 | 7/2009 | Goldberg et al. | |
| 2009/0199254 A1 * | 8/2009 | White | H04N 7/163 725/110 |
| 2011/0103394 A1 * | 5/2011 | Vogt et al. | 370/401 |
| 2012/0158875 A1 * | 6/2012 | Almeida | 709/206 |
| 2012/0166533 A1 * | 6/2012 | Rubinstein et al. | 709/204 |
| 2012/0209714 A1 * | 8/2012 | Douglas | G06Q 30/02 705/14.58 |
| 2013/0014151 A1 * | 1/2013 | Tallapaneni | H04N 21/25891 725/23 |
| 2014/0012669 A1 * | 1/2014 | Heiser et al. | 705/14.53 |

OTHER PUBLICATIONS

"Final Office Action", U.S. Appl. No. 11/934,074, (Jun. 28, 2010), 8 pages.

"Interactive Advertising and Children: Issues and Implications", http://www.childrennow.org/assets/pdf/issues_media_dtv_brief1.pdf, (2005), 3 pages.

"Non-Final Office Action", U.S. Appl. No. 11/934,074, (Jan. 28, 2010), 9 pages.

"Non-Final Office Action", U.S. Appl. No. 11/934,074, (Apr. 19, 2011), 7 pages.

"Notice of Allowance", U.S. Appl. No. 11/934,074, (Aug. 15, 2011), 7 pages.

"PCT Search Report and Written Opinion", Application No. PCT/US2008/081282, (May 8, 2009), 11 pages.

"Visible World and Tremor Media Partner for Targeted Online Ads", http://clickz.com/showPage.html?page=3626018, (May 31, 2007), 1 page.

* cited by examiner

ONLINE ADVERTISEMENT SELECTION

CROSS-REFERENCES TO RELATED APPLICATIONS

This application is a continuation of, and claims priority to, U.S. patent application Ser. No. 11/934,074 filed Nov. 1, 2007, which is incorporated herein by reference.

BACKGROUND

Advertising continues to be one of the major driving factors used to generate revenue by content providers and network operators. In traditional television advertising models, advertisements were embedded in content, such as television programs, which were then broadcast "over the air" to consumers such that the consumers were able to consume the content. Thus, in this traditional model revenue collected from advertisers was used to support the provision of the content to users.

Further, advertising models were extended as the different types of content were extended. For instance, online content (e.g., web pages and so on) may be configured to include a variety of advertisements, such as banner advertisements, pop-up ads, and so on. Thus, a viewer of a web page may also view advertisements to support provision of the web page. These different advertising models, however, were often provided separately and therefore did not leverage knowledge gained in one advertising model for another advertising model.

SUMMARY

Online advertisement selection techniques are described. In an implementation, a request for web content is received from a client device. An identity of the client device is determined based on an indication of browsing history exposed by the client device. An advertisement is then selected to be displayed in conjunction with the web content based on previously-monitored interaction data associated with the identity of the client, and the web content including the selected advertisement is provided to the client device for display.

In another implementation one or more computer-readable media embody instructions that are executable to receive a request for web content from a client device, determine an identity of the client device based on an indication of browsing history, select an advertisement to be displayed in conjunction with the web content based on previously-monitored interaction data associated with the identity of the client, and provide the web content including the selected advertisement to the client device for display.

In a further implementation, data is received that describes interaction of one or more clients with one or more advertisements embedded in television content. The data is stored in a repository according to an indication of browsing history exposed by the one or more clients respectively. An advertisement is then selected to be displayed in conjunction with web content accessed by the one or more clients based the interaction with the one or more advertisements described in the data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
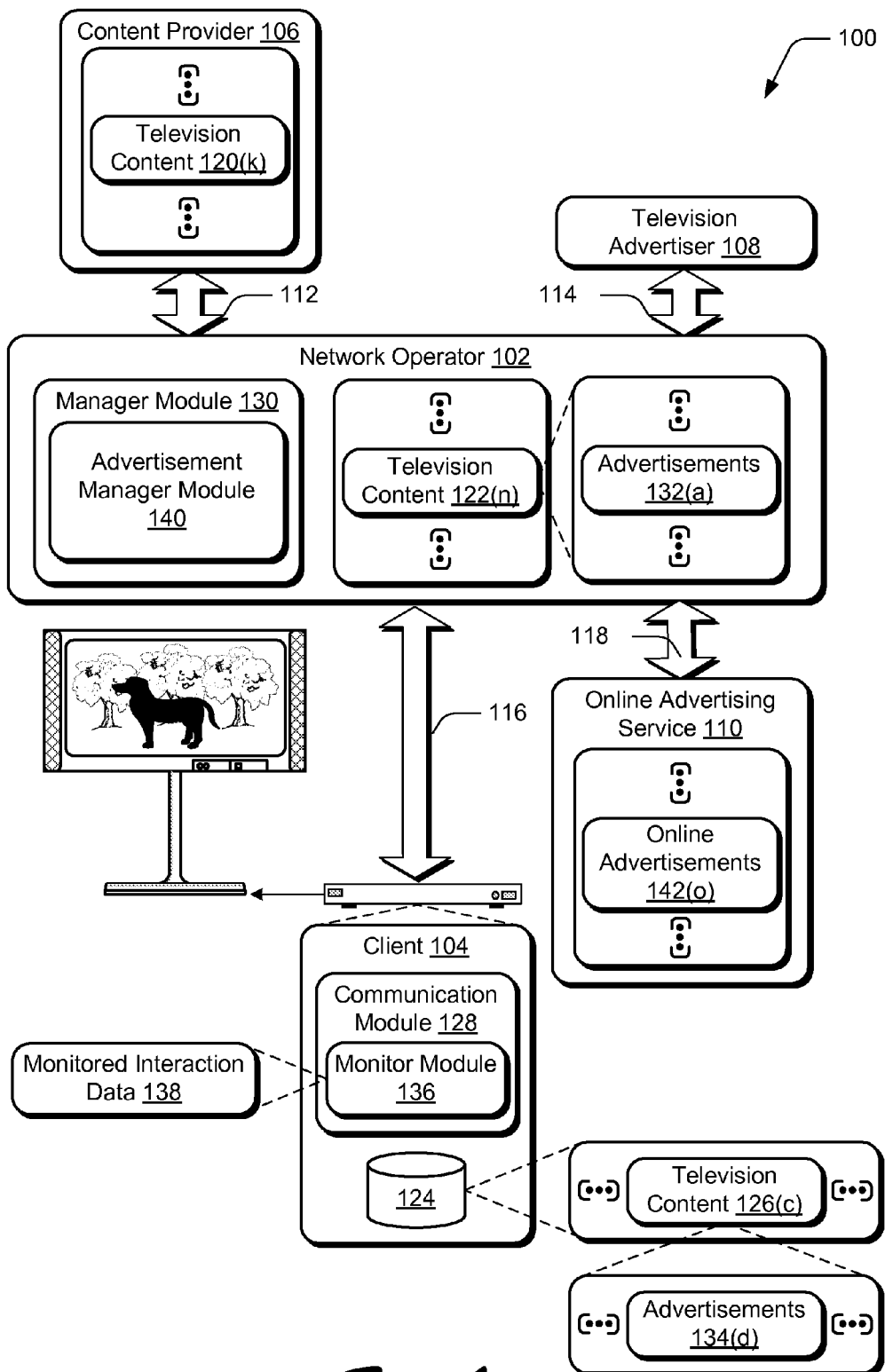
FIG. 1 is an illustration of an environment in an exemplary implementation that is operable to employ techniques to select online advertisements.

The range of content this is made available to users is ever increasing, e.g., from traditional television content to online content such as web pages, music downloads, and so on. The range of advertising techniques to support provision of this content is also ever increasing. For example, traditional television content may include embedded advertisements to support provision of the content. Online content may also employ advertising to support provision of the online content, such as banner advertisements, pop-up ads, and so on. However, these different advertising techniques (e.g., embedding advertisements in television content, banner advertisement on a webpage, and so on) were provided separately and did not leverage knowledge that may be gained by one advertising technique to improve an experience with another advertising technique.

Techniques to select online advertisements are described. In an implementation, television content interaction is monitored, such as to determine which television programs and advertisements are watched by a user, "how" the television programs and advertisements are watched (e.g., normal output versus fast forwarding), and so on. This monitored interaction may then be used to select an online advertisement for output in conjunction with online content, such as to place a banner advertisement on a web page.

For example, a network operator may provide Internet access and television content to a particular household, such as via a digital subscriber line (DSL). Because of this, the network operator may be made aware as to what television content is output at the particular household. Therefore, when a request is made to access the Internet, advertisements may be selected for inclusion on web pages that relate to the television content viewed at the household. For instance, a user may watch a television program having a car commercial. When the user accesses the Internet via a portal page, the portal page may contain a pop-up advertisement that relates to the car commercial, e.g., the car commercial in the television program and the pop-up advertisement may have a matching (i.e., the same) advertiser, in this case a car company. Thus, a consistent experience may be provided "across" the television and online experience, further increasing the effectiveness of the advertisements and consequently revenue opportunities to providers of the content as well as the advertisers. Further discussion of online advertisement selection may be found in relation to the following figures.

In the following discussion, an exemplary environment is first described that is operable to employ techniques to select online advertisements. Exemplary procedures are then described that may be employed in the exemplary environment, as well as in other environments. Although these techniques are described as employed within a television and online environment in the following discussion, it should be readily apparent that these techniques may be incorporated within a variety of environments without departing from the spirit and scope thereof. For example, content interaction with a mobile phone may also be leveraged to select advertisements to be output in conjunction with other content that is not output on the mobile phone.

Exemplary Environment

FIG. 1 is an illustration of an environment 100 in an exemplary implementation that is operable to employ techniques to select online advertisements. The illustrated environment 100 includes a network operator 102 (e.g., a "head end"), a client 104, a content provider 106, a television advertiser 108 and an online advertising service 110 that are communicatively coupled, one to another, via network connections 112, 114, 116, 118. In the following discussion, the network operator 102, the client 104, the content provider 106, the television advertiser 108 and the online advertising service 110 may be representative of one or more entities, and therefore reference may be made to a single entity (e.g., the client 104) or multiple entities (e.g., the clients 104, the plurality of clients 104, and so on). Additionally, although a plurality of network connections 112-118 are shown separately, the network connections 112-118 may be representative of network connections achieved using a single network or multiple networks. For example, network connection 116 may be representative of a broadcast network with back channel communication, an Internet Protocol (IP) network, and so on.

The client 104 may be configured in a variety of ways. For example, the client 104 may be configured as a computer that is capable of communicating over the network connection 116, such as a desktop computer, a mobile station, an entertainment appliance, a set-top box communicatively coupled to a display device as illustrated, a wireless phone, and so forth. For purposes of the following discussion, the client 104 may also relate to a person and/or entity that operate the client. In other words, client 104 may describe a logical client that includes a user, software and/or a machine (e.g., a client device).

The content provider 106 includes one or more items of television content 120(k), where "k" may be an integer from 1 to "K". The television content 120(k) may include a variety of content, such as television programming, video-on-demand (VOD) files, and so on. The television content 120(k) is communicated over the network connection 112 to the network operator 102.

Television content 120(k) communicated via the network connection 112 is received by the network operator 102 and may be stored as one or more items of television content 122(n), where "n" may be an integer from "1" to "N". The television content 122(n) may be the same as or different from the television content 120(k) received from the content provider 106. The television content 122(n), for instance, may include additional data for broadcast to the client 104, such as electronic program guide (EPG) data.

The client 104, as previously stated, may be configured in a variety of ways to receive the television content 122(n) over the network connection 114. The client 104 typically includes hardware and software to transport and decrypt television content 122(n) received from the network operator 102 for rendering by the illustrated display device. Although a display device is shown, a variety of other output devices are also contemplated, such as speakers.

The client 104 may also include digital video recorder (DVR) functionality. For instance, the client 104 may include a storage device 124 to record television content 122(n) as television content 126(c) (where "c" may be an integer from one to "C") received via the network connection 116 for output to and rendering by the display device. The storage device 124 may be configured in a variety of ways, such as a hard disk drive, a removable computer-readable medium (e.g., a writable digital video disc), and other types of computer-readable media. Thus, television content 126(c) that is stored in the storage device 124 of the client 104 may be copies of the television content 122(n) that was streamed from the network operator 102. Additionally, television content 126(c) may be obtained from a variety of other sources, such as from a computer-readable medium that is accessed by the client 104, and so on.

The client 104 includes a communication module 128 that is executable on the client 104 to control content playback on the client 104, such as through the use of one or more "command modes". The command modes may provide time-shifting techniques that may be applied to an output of the television content 126(c) (i.e., non-linear playback of the television content 126(c)) such as pause, rewind, fast forward, slow motion playback, and the like.

The network operator 102 is illustrated as including a manager module 130. The manager module 130 is representative of functionality to configure television content 122(n) for output (e.g., streaming) over the network connection 116 to the client 104. The manager module 130, for instance, may configure television content 120(k) received from the content provider 106 to be suitable for transmission over the network connection 114, such as to "packetize" the content for distribution over an Internet Protocol (IP) network (e.g., the Internet), configuration for a particular broadcast channel, map the television content 120(k) to particular channels, and so on.

Thus, in the environment 100 of FIG. 1, the content provider 106 may broadcast the television content 120(k) over a network connection 112 to a multiplicity of network operators, an example of which is illustrated as network operator 102. The network operator 102 may then stream the television content 122(n) over a network connection to a multitude of clients, an example of which is illustrated as client 104. The client 104 may then store the television content 122(n) in the storage device 124 as television content 126(c), such as when the client 104 is configured to include digital video recorder (DVR) functionality.

The television content 122(n) may also be representative of time-shifted content, such as video-on-demand (VOD) content that is streamed to the client 104 when requested, such as movies, sporting events, and so on. For example, the network operator 102 may execute the manager module 130 to provide a VOD system such that the content provider 106 supplies television content 120(k) in the form of complete content files to the network operator 102. The network operator 102 may then store the television content 120(k) as television content 122(n). The client 104 may then request playback of desired television content 122(n) by contacting the network operator 102 (e.g., a VOD server) and requesting a feed (e.g., stream) of the desired content.

In another example, the television content 122(n) may further be representative of content (e.g., television content 120(k)) that was recorded by the network operator 102 in response to a request from the client 104, in what may be referred to as a network DVR example. Like VOD, the recorded television content 122(n) may then be streamed to the client 104 when requested. Interaction with the television content 122(n) by the client 104 may be similar to interaction that may be performed when the television content 126(c) is stored locally in the storage device 124.

To collect revenue using a traditional advertising model, the content provider 106 may embed advertisements in the television content 120(k). Likewise, the network operator 102 may also embed advertisements obtained from the television advertiser 108 in the television content 122(n) to also collect revenue using the traditional advertising model. For example, the content provider 106 may correspond to a "national" television broadcaster and therefore offer the television content 120(k) and national advertising opportunities to advertisers, which are then embedded in the television content 120(k). The network operator 102, on the other hand, may correspond to a "local" television broadcaster and offer the television content 122(n) with the advertisements embedded by the content provider 106 as well as advertisements obtained from local advertisers to the client 104. Thus, the advertisements 130(d) which are embedded in the television content 126(c) streamed to the client 104 may be provided from a variety of sources. Consequently, the one or more advertisements 134(d) embedded in the television content 126(c) at the client 104 may also originate from a wide variety of sources. Although national and local examples were described, a wide variety of other examples are also contemplated.

The communication module 128 of the client is also illustrated as including a monitor module 136. The monitor module 136 is representative of functionality to monitor interaction of the client 104 with television content 122(n) and advertisements 132(a) provided directly from the network operator 102 and/or indirectly from the network operator 102, such as television content 126(c) and advertisements 134(d). Data may be generated by the monitor module 136 that describes this monitored interaction, which is illustrated as monitored interaction data 138 in FIG. 1.

The manager module 130 is also illustrated as including an advertisement manager module 140, which is representative of functionality to leverage the monitored interaction data 138 to select one or more online advertisements 142(o), where "o" may be an integer between one and "O". For example, the advertisement manager module 140 may determine which television content 122(n) and/or television content 126(c) was output by the client 104. Using this information, the advertisement manager module 140 may make an "informed" decision as to which of the one or more online advertisements 142(o) is to be output in conjunction with online content.

For example, the network operator 102 may provide access to television content 122(n) as well as Internet access to obtain online content, such as web pages. The network operator 102 may leverage knowledge gained by analysis of the monitored interaction data 138 to provide advertisements on a portal webpage that is initially output at the client 104 when accessing the Internet. Thus, the advertisements output during online access are "tied" to the television content, such as to subject matter of the television content, which advertisements 132(a) were output, and so on. Although the advertisement manager module 140 is illustrated as being employed by the network operator, however, it should be readily apparent that the functionality of the advertisement manager module 140 may be employed by a variety of entities, such as by the online advertising service 110, an example of which is illustrated and discussed in relation to the following figure.

Figure 2:
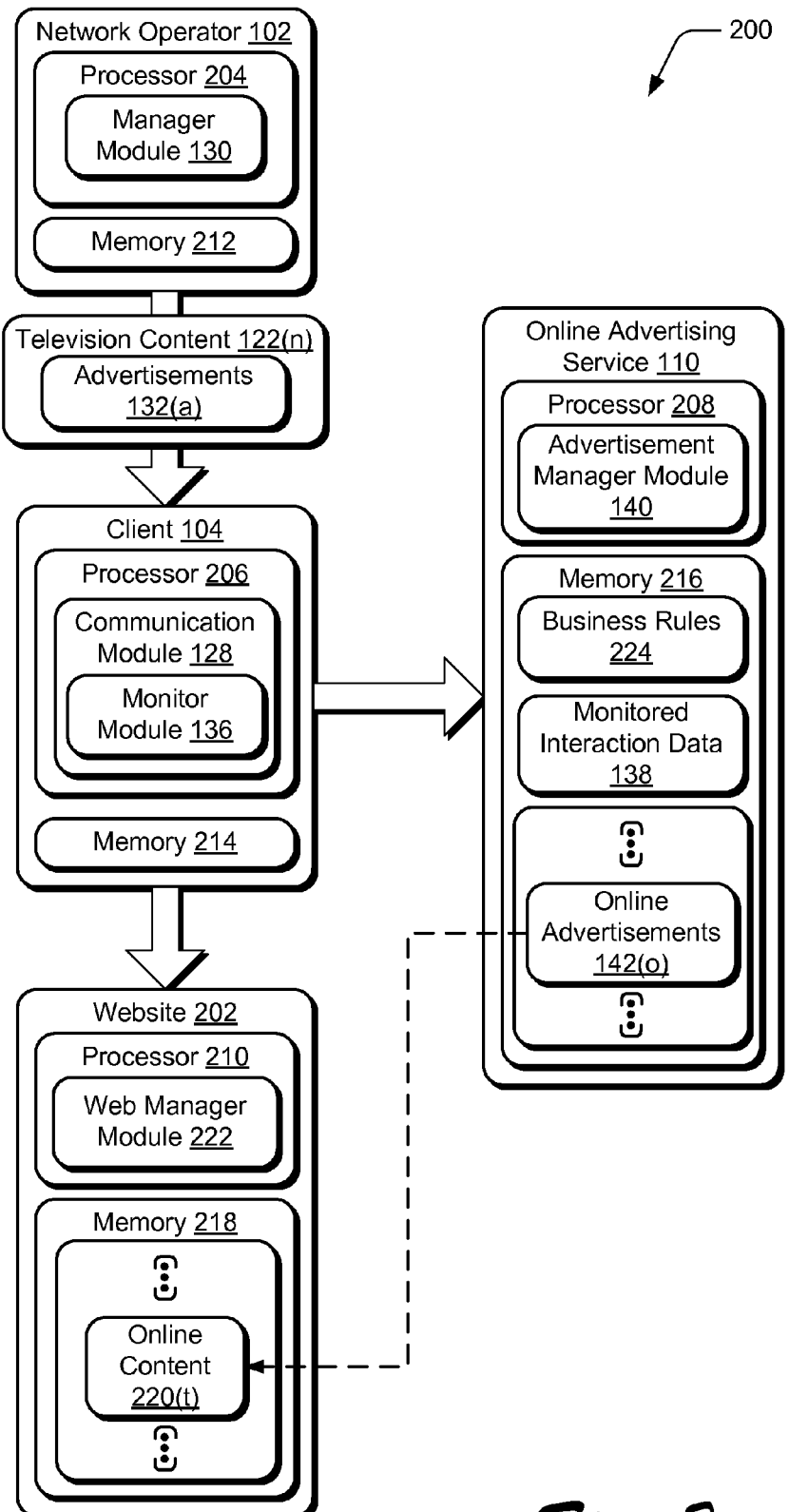
FIG. 2 is an illustration of a system in an exemplary implementation showing a network operator, a client and an online advertising service in greater detail in conjunction with a website.

FIG. 2 depicts a system 200 in an exemplary implementation showing the network operator 102, the client 104 and the online advertising service 110 in greater detail in conjunction with a website 202. The network operator 102, the client 104, the online advertising service 110 and the website 202 are depicted as being implemented by one or more devices (e.g., the client 104 is illustrated as a client device) having respective processors 204, 206, 208, 210 and memory 212, 216, 216 and 218.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 212, 216, 216 and 218 is shown, respectively, for the devices, a wide variety of types and combinations of memory may be employed, such as random access memory (RAM), hard disk memory, removable medium memory, and other types of computer-readable media.

The network operator 102 is illustrated as executing the manager module 130 on the processor 204, which is storable in memory, to broadcast television content 122(n) having embedded advertisements 132(a) over an IP network (depicted via an arrow) to the client 104.

The client 104 is illustrated as executing a communication module 128 having a monitor module 136 on the processor 206, which are storable in memory 214. As previously described, the communication module 128 is representative of functionality to output the television content 122(n) (and the embedded advertisements 132(a)), such as for rendering by a display device having speakers.

The monitor module 136 is representative of functionality to monitor interaction of the client 104 with the television content 122(n), e.g., in real time as the television content 122(n) is broadcast by the network operator 102, during time-shifted output from the storage device 124 of FIG. 1, from a computer-readable medium (e.g., a digital video disc), and so on. In the illustrated system 200 of FIG. 2, the monitored interaction data 138 is communicated to the online advertising service 110 and stored in memory 216. As previously described, the monitored interaction data 138 may be leveraged to coordinate the online advertisements 142(o) that are output with online content with the television content 122(n) output at the client 104.

As an example, the client 104 may access the website 202 (e.g., through another network operator, the network operator 102 that provided the television content 122(n), and so on) to request online content 220(t), where "t" may be an integer between one and "T". The website 202 is illustrated as being implemented by a web manager module 222 that is representative of functionality to manage provision of the online content 220(t).

The web manager module 222 may redirect the client 104 to the online advertising service 110 to obtain online advertisements 142(o) to be output in conjunction with the online content 220(t), which is illustrated in FIG. 2 through the use of a dashed line.

The online advertising service 110 is illustrated as executing the advertisement manager module 140 on the processor 208, which is storable in memory 216. The advertisement manager module 140, when executed, may determine an identity of the client 104, such as by examining one or more "cookies" stored in memory 214 of the client 104, identifying an IP address used by the client 104 to access the online advertising service 110, and so on. This identification may then be used to locate the monitored interaction data 138 that corresponds to the client 104.

The advertisement manager module 140 may then select one or more of the online advertisements 142(o) to be output in conjunction with the online content 220(t) and may also address business rules 224. The online advertisements 142(o), for instance, may indicate that the client 104 has output a significant number of car advertisements and even that a large portion of these advertisements correspond to a particular car manufacturer. To increase the effectiveness of the television advertisements as well as the online advertisements, the advertisement manager module 140 may select online advertisements 142(o) of the particular car manufacturer for output.

In an instance that such an online advertisement is not available, similar advertisements may be selected using the business rules 224. For example, an online advertiser may have purchase guarantees for a certain number of impressions. Thus, the online advertising service 110 may leverage the monitored interaction data 138 along with other business rules 224 to coordinate online advertisements 142(o) output in conjunction with online content 220(t) with television content 122(n) and advertisements 132(a) that are embedded in the television content 122(n). A variety of other examples are also contemplated, further discussion of which may be found in relation to the following exemplary procedures.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the described techniques are platform-independent, meaning that the techniques may be implemented on a variety of commercial computing platforms having a variety of processors.

Exemplary Procedures

The following discussion describes techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
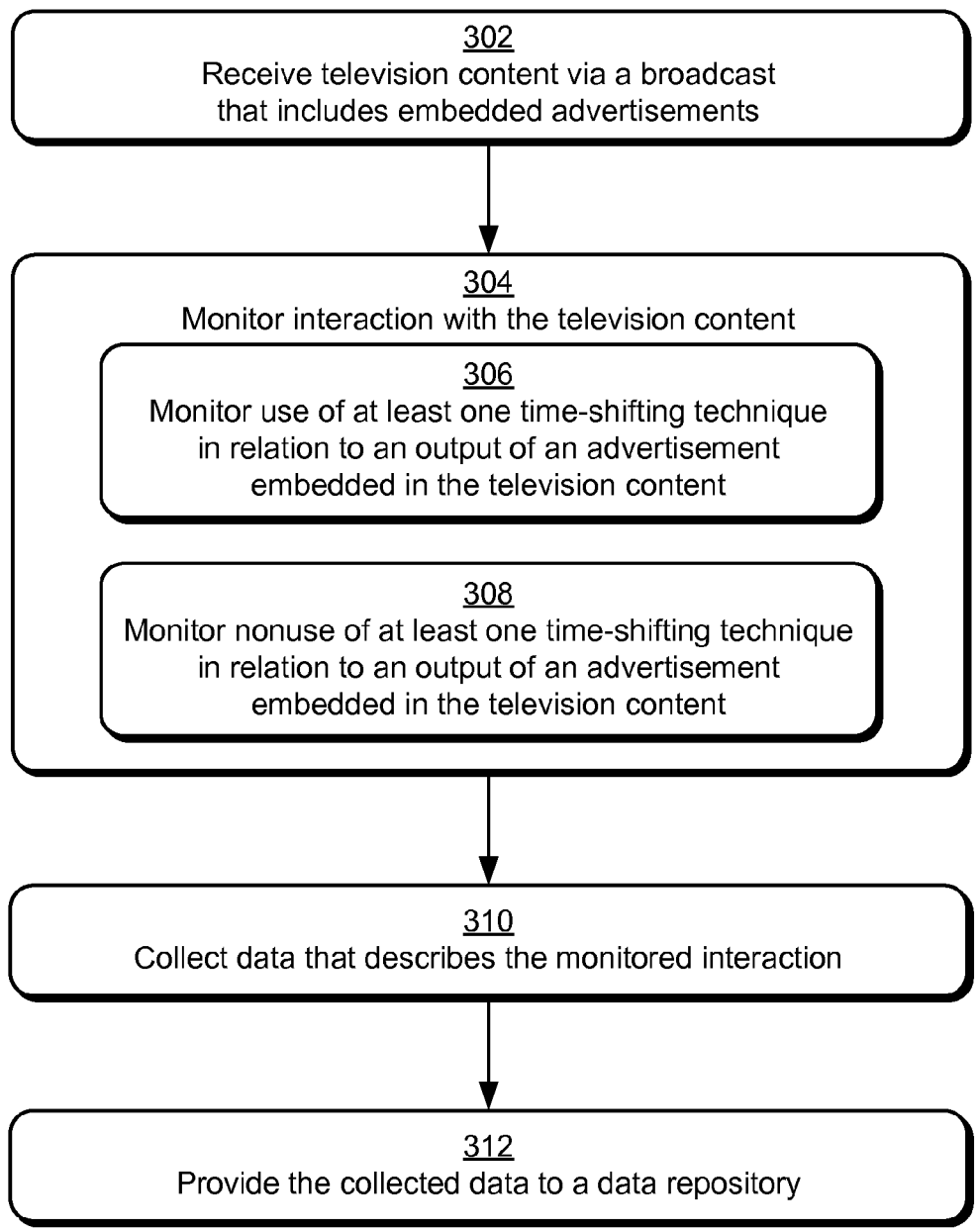
FIG. 3 is a flow diagram depicting a procedure in an exemplary implementation in which data is collected that describes monitored interaction of a client with television content.

FIG. 3 depicts a procedure 300 in an exemplary implementation in which data is collected that describes monitored interaction of a client with television content. Television content is received via a broadcast that includes embedded advertisements (block 302). The television content 122(n), for instance, may be broadcast by the network operator 102 via an IP network (e.g., the Internet) to the client 104 using a digital subscriber line. A variety of other instances are also contemplated, such as through use of a traditional "over-the-air" broadcast, via a cable (e.g., digital cable) connection, satellite, and so on.

Interaction with the television content is monitored (block 304), which may be performed in a variety of ways. As an example, "which" television content 122(n), 126(c) was output by the client 104 may be monitored, e.g., via periods of time that particular broadcast channels were watched, through identifiers of particular television content 122(n) and/or advertisements 132(a), and so on.

As another example, "how" the interaction was performed may also be monitored. For instance, use of at least one time-shifting technique in relation to an output of an advertisements embedded in the television content may be monitored (block 306), such as which advertisements 134(d) were "fast forwarded" when the television content 126(c) is output from the storage device 124 in a DVR example. Thus, in this instance a determination is made as to which of the advertisements 134(d) are not "liked" by the client 104.

In another instance, nonuse of at least one time-shifting technique in relation to an output of an advertisements embedded in the television content may be monitored (block 308). Continuing with the previous example, this instance may track which advertisements 134(d) were permitted output (e.g., not "fast forwarded") when the television content 126(c) is output from the storage device 124 in the DVR example and thus were "liked" by the client 104. Thus, use and/or nonuse of time-shifting techniques may be indicative of which advertisements have an increased likelihood of being of interest to the client 104. A variety of other instances are also contemplated.

Data that describes the monitored interaction is collected (block 310) and the collected data is provided to a data repository (block 312). For example, the monitor module 136 may collect the monitored interaction data 138 and periodically upload it to the online advertising service 110 to be stored in memory 216. Likewise, the online advertising service 110 may collect similar monitored interaction data from other clients to form a repository to provide increased "richness" when providing online advertisement 142(o) that address the television content 122(n) and/or advertisements 132(a) embedded in the television content 122(n), further discussion of which may be found in relation to the following procedure.

Figure 4:
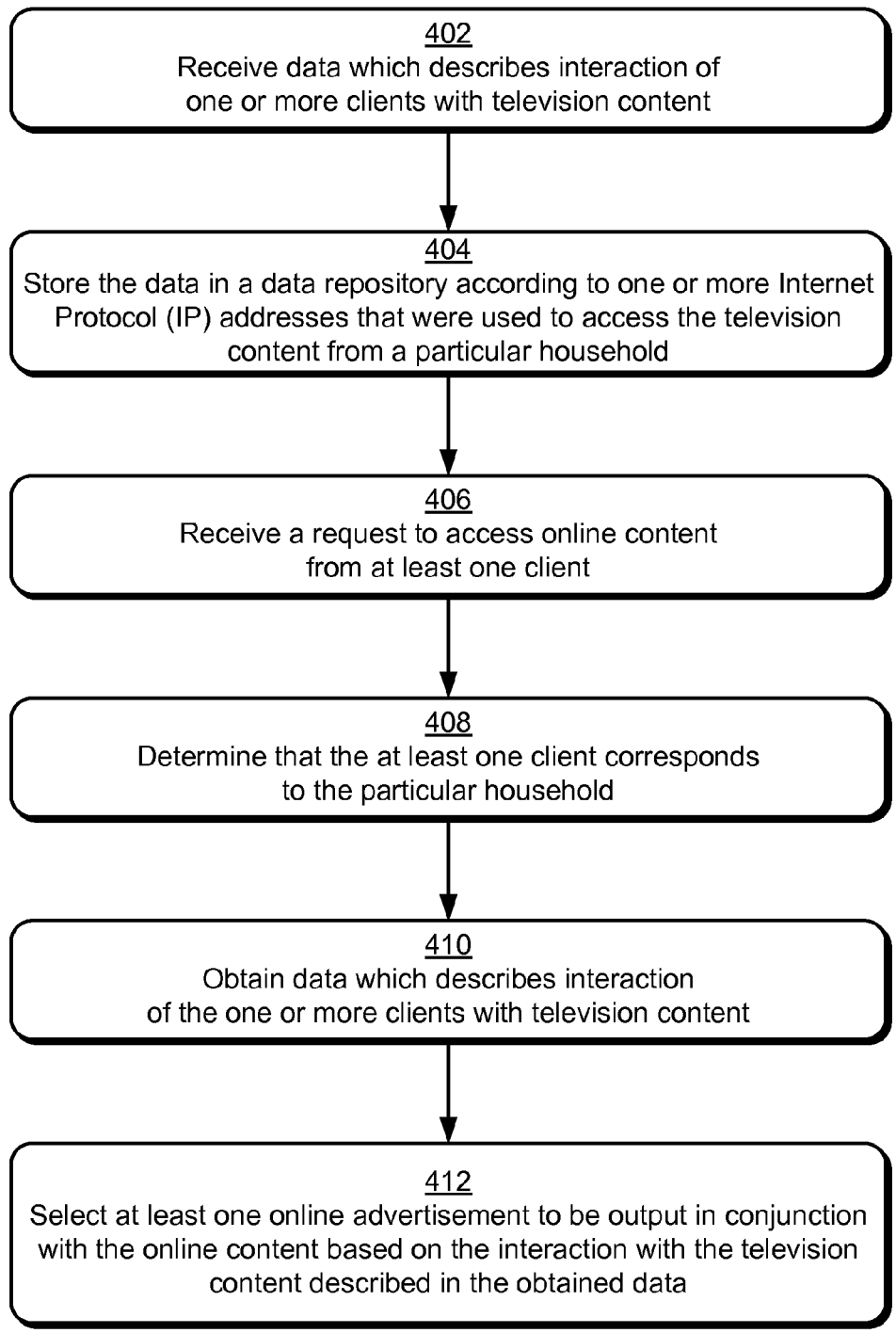
FIG. 4 is a flow diagram depicting a procedure in an exemplary implementation in which online advertisements are selected based on data that describes monitored interaction with television content as described in relation to FIG. 3.

FIG. 4 depicts a procedure 400 in an exemplary implementation in which online advertisements are selected based on the data that describes monitored interaction with television content as described in relation to FIG. 3. Data is received which describes interaction of one or more clients with television content (block 402). As previously described, this data may describe interaction in a variety of ways, such as through channel and time, specific identifiers of television content and/or advertisements, and so on.

The data is stored in a data repository according to one or more Internet Protocol (IP) addresses that were used to access the television content from a particular household (block 404). A variety of other examples are also contemplated, such as to store the data according to an identifier that is to be contained in a cookie on the client 104 for later retrieval by the online advertising service 110, and so on.

A request is received to access online content from at least one client (block 406). For example, a client configured as a set-top box (an example of which is illustrated in FIG. 1) in a particular household (e.g., a residence) may be used to receive television content 122(n) via a particular IP address. The particular IP address may be assigned to the client by the network operator, e.g., singly or as part of a range of IP addresses. A user at the particular household may then use a laptop computer to request online content, such as to access a website via the Internet.

A determination is made that the at least one client corresponds to the particular household (block 408). Continuing with the previous example, the laptop computer used to access the Internet may use an IP address assigned by the network operator 102 which may be the same IP address or another IP address in the range assigned to the particular household. The online advertising service 110 may therefore determine that the laptop is a part of the particular household.

Accordingly, data is obtained which describes interaction of the one or more clients with the television content (block 410), such as the data from the repository that corresponds to the particular household through the IP address and/or the range of IP addresses previously described.

At least one online advertisement to be output in conjunction with the online content is selected based on the interaction with the television content described in the obtained data (block 412). As an example, the online advertisement 142(o) may be selected that has a corresponding advertiser that matches an advertiser of advertisements 132(a) embedded in the television content 122(n), such as a particular car manufacturer. In another example, online advertisements from a similar advertiser may be output, such as an online advertisement from another car manufacturer.

Selection of the online advertisements 142(o) may also be based on the use to time-shifting techniques. For example, online advertisements that have a matching and/or similar advertiser (e.g., same subject matter, different advertiser) to that of advertisements that were permitted output at the client 104 (e.g., a time-shifting technique such as fast forward was not used) may be selected as being "favored" by the client 104. Likewise "disfavored" advertisements 132(a) in the television content 122(n) that were time shifted (e.g., fast forwarded) may be used to prevent similar online advertisements 142(o) from being output. A variety of other examples are also contemplated to coordinate online advertisement 142(o) selection with advertisements 132(a) that are embedded in television content 122(n).

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A device-implemented method comprising:
   receiving, from a first client device using a particular Internet Protocol (IP) address, a request for Internet access to enable display of non-video web content;
   determining a location with which the first client device is associated based on the particular IP address used by the first client device;
   obtaining, based on the location, previously-monitored interaction data of a second client device associated with the location, the previously-monitored interaction data describing interaction with advertisements embedded in television content output by the second client device, the interaction including at least one use of a time-shifting operation during output of a first one of the advertisements and at least one non-use of the time-shifting operation during output of a second one of the advertisements, the television content accessed by the second client device using the same particular IP address, wherein the at least one use of the time-shifting operation indicating that the first one of the advertisements is a disfavored advertisement and the at least one non-use of the time-shifting operation indicating that the second one of the advertisements is a favored advertisement;
   selecting, for the first client device, an advertisement to be displayed in conjunction with the non-video web content based on the previously-monitored interaction data of the second client device, wherein the selection of the advertisement to be displayed to prevent disfavored advertisements from being displayed; and
   providing, to the first client device, the non-video web content and the selected advertisement for display by the first client device within a portal webpage associated with initiation of the Internet access.

2. The device-implemented method as described in claim 1, wherein the selected advertisement and the second advertisement embedded in television content are associated with a same advertiser.

3. The device-implemented method as described in claim 1, further comprising selecting the advertisement to be displayed based on a browsing history exposed by the first client device that includes one or more cookies stored by the first client device.

4. The device-implemented method as described in claim 1, wherein the previously-monitored interaction data is received from another device that is not the second client device.

5. The device-implemented method as described in claim 4, wherein:
   the television content is provided by a network operator to the second device; and
   the non-video web content provided to the first client device includes a web page provided by the network operator.

6. The device-implemented method as described in claim 4, wherein the location is a single household, the first client device and the second client device are configured to be situated in the single household, and the single household is identifiable to perform the selecting via the particular IP address.

7. A computer-readable media device comprising instructions executable by a processor to:
   receive, via a network and from a first client device using a particular Internet Protocol (IP) address, a request for Internet access, the first client device not associated with a television;
   determine a location of the first client device based on the particular IP address used by the first client device;
   obtain, based on the location of the first client device, previously-monitored interaction data of a second client device associated with the location of the first client device, the previously-monitored interaction data describing interaction with advertisements embedded in television content output by the second client device, the interaction including at least one use of a time-shifting operation during output of a first one of the advertisements and at least one non-use of the time-shifting operation during output of a second one of the advertisements, the television content received through the network by the second client device using the same particular IP address, wherein the at least one use of the time-shifting operation indicating that the first one of the advertisements is a disfavored advertisement and the at least one non-use of the time-shifting operation indicating that the second one of the advertisements is a favored advertisement;
   select, based on the previously-monitored interaction data of the second client device, an advertisement to be displayed in conjunction with a portal webpage through which the Internet is accessed, wherein the selection of the advertisement to be displayed to prevent disfavored advertisements from being displayed; and provide, via the network and to the first client device, the selected advertisement for display by the first client device within the portal webpage through which the Internet is accessed.

8. The computer-readable media device as described in claim 7, wherein the at least one use of the time-shifting operation includes fast forwarding through at least a portion of the first advertisement and the at least one nonuse of the time-shifting operation includes not fast forwarding through the second advertisement.

9. The computer-readable media device as described in claim 7, wherein the Internet and television content are accessible via an operator of the network that assigned the particular IP address to the first client device and the second client device.

10. The computer-readable media device as described in claim 7, wherein the instructions are further executable to receive the previously-monitored interaction data from another device not co-located with the first client device and the second client device.

11. The computer-readable media device as described in claim 7, wherein the instructions are further executable to select the advertisement to be displayed within the portal webpage based on business rules associated with the advertiser.

12. A system comprising:
one or more processors; and
one or more computer-readable storage media embodying processor-executable instructions that, responsive to execution by the one or more processors, implement operations comprising:
receiving data which describes interaction of one or more users with advertisements embedded in television content accessed by a first client device using a particular Internet Protocol (IP) address, the interaction including at least one use of a time-shifting operation during output of a first one of the advertisements and at least one non-use of the time-shifting operation during output of a second one of the advertisements, the particular IP address associated with a location of the users, wherein the at least one use of the time-shifting operation indicating that the first one of the advertisements is a disfavored advertisement and the at least one non-use of the time-shifting operation indicating that the second one of the advertisements is a favored advertisement;
storing the data in a repository according to the IP address and the location of the users;
receiving, from a second client device using the same particular IP address, a request for Internet access at the location, the second client device not associated with a television;
selecting, based on the data, an advertisement to be displayed in conjunction with a portal webpage through which the internet is accessed, wherein the selection of the advertisement to be displayed to prevent disfavored advertisements from being displayed; and
providing, to the second client device, the selected advertisement for display by the second client device within the portal webpage through which the Internet is accessed.

13. The system as described in claim 12, wherein the first and second client devices are separate hardware-based devices that are configured to be associated with a particular household which is identifiable by the particular IP that is used to access the television content and the Internet.

14. The system as described in claim 12, further comprising storing the data in the repository in accordance with an indication of browsing history exposed by the first client device, the indication including a cookie stored by the first client device.

15. The system as described in claim 12, wherein the selected advertisement and the second advertisement embedded in television content are associated with a same advertiser.

16. The system as described in claim 12, wherein the first client device is or associated with a television and the second client device includes a mobile phone, a laptop computer, or a desktop computer.

17. The computer-readable media device as described in claim 7, wherein the first client device and the second client device are separate hardware-based devices that are configured to be associated with a particular household which is identifiable by the particular IP address that is used to access the television content and the Internet.

18. The computer-readable media device as described in claim 7, wherein the first client device includes a mobile phone, a laptop computer, or a desktop computer.

19. The system as described in claim 12, wherein the Internet and television content are accessible via a network operator.

20. The system as described in claim 12, wherein selecting the advertisement to be displayed is based further on a browsing history exposed by the second client device that includes one or more cookies stored by the second client device.

* * * * *